US009543878B2

United States Patent
Sanada et al.

(10) Patent No.: US 9,543,878 B2
(45) Date of Patent: Jan. 10, 2017

(54) DRIVE UNIT AND TRANSPORT MACHINE

(71) Applicant: KABUSHIKI KAISHA YASKAWA DENKI, Kitakyushu-shi (JP)

(72) Inventors: Tomohiko Sanada, Kitakyushu (JP); Koji Higashikawa, Kitakyushu (JP); Tasuku Isobe, Kitakyushu (JP); Aiko Higuchi, Kitakyushu (JP); Fumiaki Ikeda, Kitakyushu (JP); Kenji Yamada, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/014,288

(22) Filed: Feb. 3, 2016

(65) Prior Publication Data

US 2016/0233811 A1 Aug. 11, 2016

(30) Foreign Application Priority Data

Feb. 6, 2015 (JP) ................................ 2015-022379

(51) Int. Cl.
| | |
|---|---|
| *H02P 1/00* | (2006.01) |
| *H02P 3/00* | (2006.01) |
| *H02P 7/06* | (2006.01) |
| *H02P 25/18* | (2006.01) |
| *H02P 27/04* | (2016.01) |
| *H02P 6/14* | (2016.01) |
| *H02M 1/34* | (2007.01) |

(52) U.S. Cl.
CPC ............ *H02P 25/188* (2013.01); *H02P 6/14* (2013.01); *H02P 27/047* (2013.01); *H02P 29/032* (2016.02); *H02M 1/34* (2013.01)

(58) Field of Classification Search
CPC ...................................................... H02P 29/027
USPC ........................................................ 318/495
See application file for complete search history.

(56) References Cited

FOREIGN PATENT DOCUMENTS

| EP | 1 439 633 A1 | 7/2004 |
| JP | 2013-090406 A | 5/2013 |
| WO | WO 2010/116182 A1 | 10/2010 |

OTHER PUBLICATIONS

Extended European Search Report issued Jul. 4, 2016 in EP 16154160.2 filed Feb. 4, 2016.
J.C. Das, et al. "Characteristics and Analysis of Starting of Large Synchronous Motors", Industrial & Commercial Power Systems Technical Conference, 1999 IEEE. Sparks, NV, USA May 2-6, 1999, Piscataway, NJ, USA, IEEE, US, May 2, 1999, p. 1-10, XP010348537, ISBN: 978-0-7803-5593-4.

*Primary Examiner* — Erick Glass
(74) *Attorney, Agent, or Firm* — Oblon, McClelland, Maier & Neustadt, L.L.P.

(57) ABSTRACT

A drive unit includes: an inverter; an electric motor that has a first winding connected to an output part of the inverter and a second winding connected to the first winding; a first semiconductor switch that has a first end connected to the first winding and a second end connected to the second winding; a second semiconductor switch that has a first end and a second end connected to the first winding and the first semiconductor switch; and a snubber circuit that is provided between the second end of the first semiconductor switch and the first end of the second semiconductor switch and has a capacitor and a diode.

10 Claims, 7 Drawing Sheets

DRIVE UNIT AND TRANSPORT MACHINE

CROSS-REFERENCE TO RELATED APPLICATION

This application claims priority from Japanese Patent Application No. 2015-022379 filed with the Japan Patent Office on Feb. 6, 2015, the entire content of which is hereby incorporated by reference.

BACKGROUND

1. Technical Field

The present disclosure relates to a drive unit and a transport machine.

2. Description of the Related Art

JP-A-2013-90406 discloses a winding-switched drive motor for electric vehicle. This motor has a motor main body and a current controller. The motor main body is a three-phase brushless motor having a first coil and a second coil in each of U, V, and W phases. The current controller has a first switch and a second switch provided in each of the phases. The current controller switches by the first and second switches between the state in which current is carried to only the first coil and the state in which current is carried to the both coils.

SUMMARY

A drive unit includes: an inverter; an electric motor that has a first winding connected to an output part of the inverter and a second winding connected to the first winding; a first semiconductor switch that has a first end connected to the first winding and a second end connected to the second winding; a second semiconductor switch that has a first end and a second end connected to the first winding and the first semiconductor switch; and a snubber circuit that is provided between the second end of the first semiconductor switch and the first end of the second semiconductor switch and has a capacitor and a diode.

DESCRIPTION OF THE EMBODIMENTS

Figure 1:
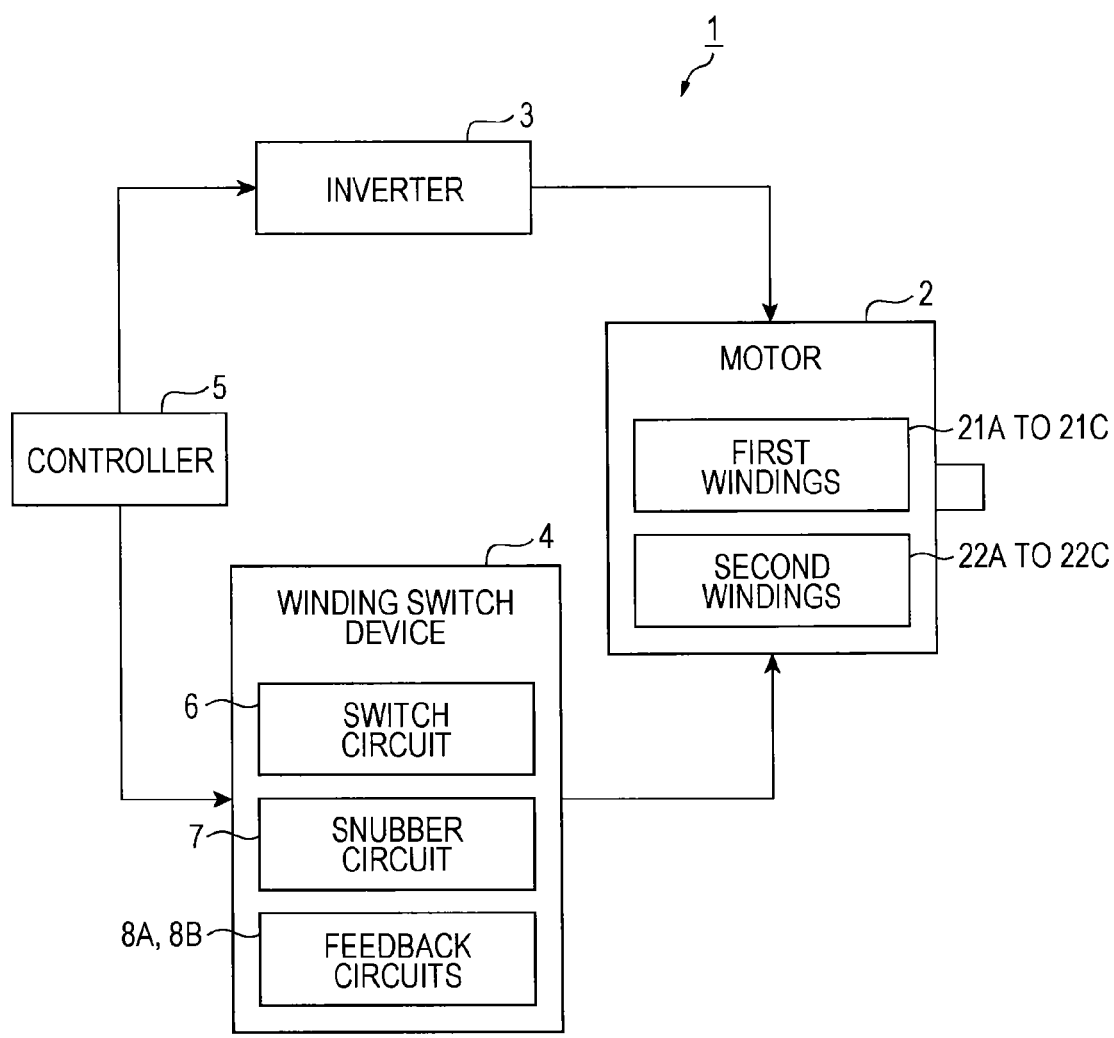
FIG. 1 is a block diagram illustrating a schematic configuration of a drive unit.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A drive unit according to one embodiment of the present disclosure includes: an inverter; an electric motor that has a first winding connected to an output part of the inverter and a second winding connected to the first winding; a first semiconductor switch that has a first end connected to the first winding and a second end connected to the second winding; a second semiconductor switch that has a first end and a second end connected to the first winding and the first semiconductor switch; and a snubber circuit that is provided between the second end of the first semiconductor switch and the first end of the second semiconductor switch and has a capacitor and a diode.

A transport machine according to one embodiment of the present disclosure includes a drive unit. The drive unit includes: an inverter; an electric motor that has a first winding connected to an output part of the inverter and a second winding connected to the first winding; a first semiconductor switch that has a first end connected to the first winding and a second end connected to the second winding; a second semiconductor switch that has a first end and a second end connected to the first winding and the first semiconductor switch; and a snubber circuit that is provided between the second end of the first semiconductor switch and the first end of the second semiconductor switch and has a capacitor and a diode.

According to the embodiments of the present disclosure, occurrence of a surge voltage at the time of winding switching can be suppressed by a simple circuit configuration.

Embodiments will be described below in detail with reference to the drawings. In the following description, identical elements or elements having identical functions will be given identical reference signs, and duplicated descriptions will be omitted.

[Overview of a Drive Unit]

As illustrated in FIG. 1, a drive unit 1 according to this embodiment includes an electric motor 2, an inverter 3, a winding switch device 4, and a controller 5.

The electric motor 2 is a three-phase AC motor that has first windings 21A, 21B, and 21C according to the phases of three-phase AC power and second windings 22A, 22B, and 22C according to the phases of three-phase AC power. The electric motor 2 may be an induction type or a synchronous type, or may be a rotary type or a linear-motion type. When the electric motor 2 is a rotary type, the first windings 21A, 21B, and 21C and the second windings 22A, 22B, and 22C generate a rotating magnetic field according to input of three-phase AC power. When the electric motor 2 is a linear-motion type, the first windings 21A, 21B, and 21C and the second windings 22A, 22B, and 22C generate a linearly progressing magnetic field according to input of three-phase AC power.

The inverter 3 converts input DC power into three-phase AC power and outputs the three-phase AC power. The winding switch device 4 has a switch circuit 6, a snubber circuit 7, feedback circuits 8A and 8B. The switch circuit 6 switches the supply state of three-phase AC power between a first state and a second state. In the first state, the three-phase AC power output from the inverter 3 is supplied to both the first windings 21A, 21B, 21C and the second windings 22A, 22B, 22C. In the second state, the three-phase AC power from the inverter 3 is supplied to the first windings 21A, 21B, and 21C but is not supplied to the second windings 22A, 22B, and 22C. The snubber circuit 7 absorbs a surge voltage resulting from the switching of the supply state of three-phase AC power by the switch circuit 6. The feedback circuits 8A and 8B feed charge accumulated in the snubber circuit 7 back to AC bus lines 31A and 31B.

The controller 5 is configured to control the inverter 3 to generate three-phase AC power at a desired frequency and control the winding switch device 4 to switch the supply state of three-phase AC power between the first state and the second state. The controller 5 controls first semiconductor switches 61A, 61B, and 61C and second semiconductor switches 62A, 62B, and 62C (see FIG. 2) of the switch circuit 6 to bring the supply state of three-phase AC power into the first state when the driving speed of the electric motor 2 is lower than a predetermined threshold. The controller 5 also controls the first semiconductor switches 61A, 61B, and 61C and the second semiconductor switches 62A, 62B, and 62C to bring the supply state of three-phase AC power into the second state when the driving speed of the electric motor 2 is higher than the threshold. Accordingly, at the time of low-speed driving of the electric motor 2, the controller 5 can generate high driving force (torque of the rotary-type electric motor 2). At the time of high-speed driving of the electric motor 2, the controller 5 can suppress reduction in driving force resulting from counter electromotive force. The controller 5 includes one or more control computers having a processor, a temporary memory, a storage, an I/O port, and the like, for example.

[Circuit Configuration of the Drive Unit]

(Inverter)

Figure 2:
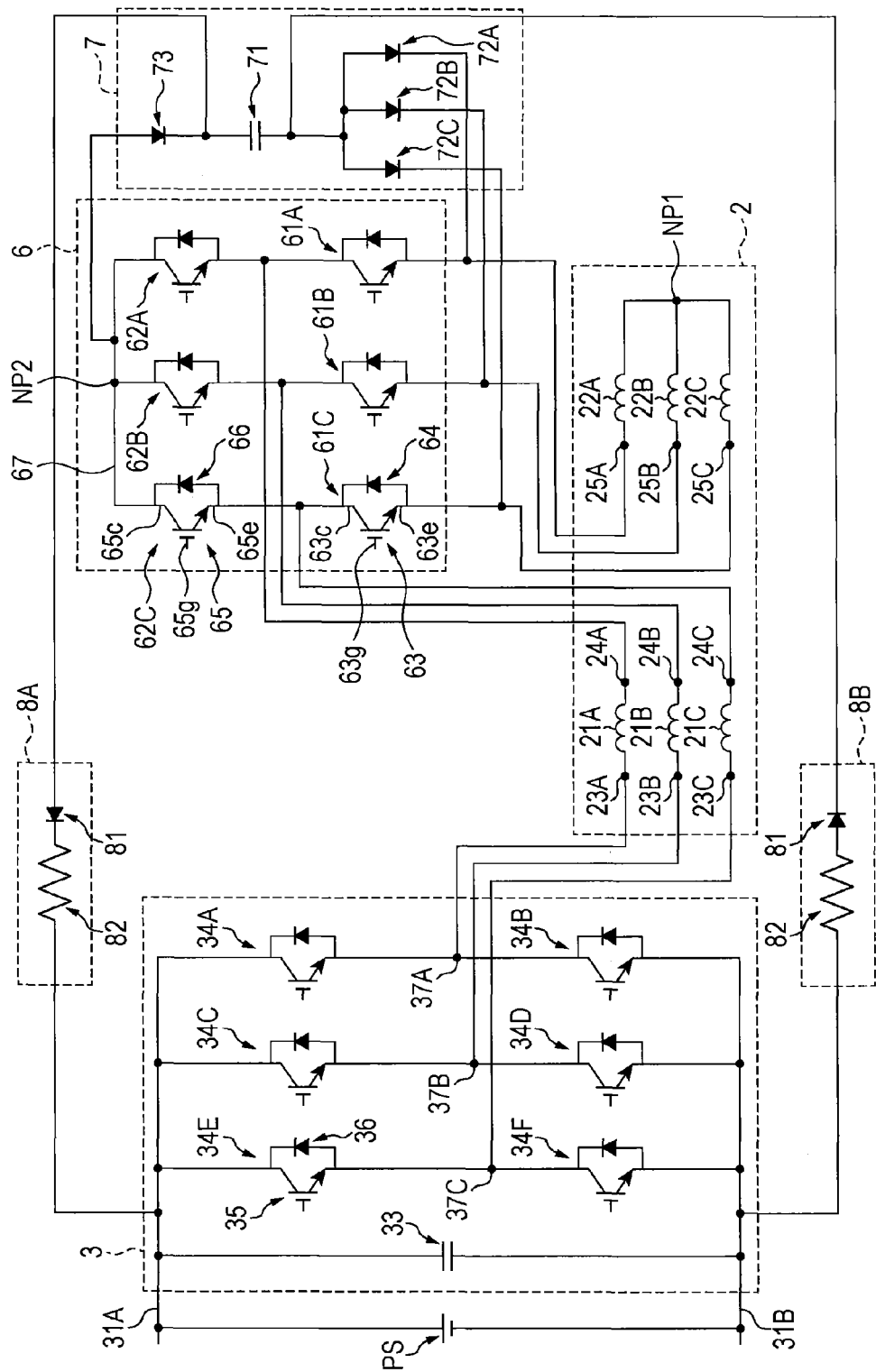
FIG. 2 is a circuit diagram in the drive unit.

As illustrated in FIG. 2, the inverter 3 has a pair of DC bus lines 31A and 31B, a smoothing capacitor 33, and semiconductor switches 34A to 34F. The DC bus lines 31A and 31B are connected to positive and negative electrodes of a power source PS, respectively. Both ends of the smoothing capacitor 33 are connected to the DC bus lines 31A and 31B, respectively. The semiconductor switches 34A and 34B are connected in series. The semiconductor switches 34C and 34D are connected in series. The semiconductor switches 34E and 34F are connected in series. Both ends of each of the pairs are connected to the DC bus lines 31A and 31B, respectively.

The semiconductor switches 34A, 34B, 34C, 34D, 34E, and 34F are switched between on state and off state according to a command signal from the controller 5. When being in the on state, the semiconductor switches 34A, 34B, 34C, 34D, 34E, and 34F enable current to pass from the DC bus line 31A to the DC bus line 31B. When being in the off state, the semiconductor switches 34A, 34B, 34C, 34D, 34E, and 34F disable current to pass from the DC bus line 31A to the DC bus line 31B. The inverter 3 outputs three-phase AC power from between the semiconductor switches 34A and 34B, between the semiconductor switches 34C and 34D, and between the semiconductor switches 34E and 34F according to a command signal from the controller 5. In the following description, the intermediate part between the semiconductor switches 34A and 34B will be referred to as output part 37A, the intermediate part between the semiconductor switches 34C and 34D as output part 37B, and the intermediate part between the semiconductor switches 34E and 34F as output part 37C.

The semiconductor switches 34A, 34B, 34C, 34D, 34E, and 34F may be integrated as a semiconductor module. Such a semiconductor module finds widespread application mainly in inverters.

The electric motor 2 has the first windings 21A, 21B, and 21C and the second windings 22A, 22B, and 22C describe above. The electric motor 2 further has first terminals 23A, 23B, and 23C, second terminals 24A, 24B, and 24C, and third terminals 25A, 25B, and 25C.

The first windings 21A, 21B, 21C and the second windings 22A, 22B, 22C are built in the electric motor 2 in the state of being separated from each other. The first terminals 23A, 23B, and 23C are conducting at first ends of the first windings 21A, 21B, and 21C, respectively. The second terminals 24A, 24B, and 24C are conducting at the second ends of the first windings 21A, 21B, and 21C, respectively. The third terminals 25A, 25B, and 25C are conducting at first ends of the second windings 22A, 22B, and 22C, respectively. The second windings 22A, 22B, and 22C are mutually electrically connected via a connection portion. The connection portion constitutes a neutral point NP1.

The first terminals 23A, 23B, and 23C are connected to output portions 37A, 37B, and 37C of the inverter 3, respectively. The second terminals 24A, 24B, and 24C and the third terminals 25A, 25B, and 25C are connected to the switch circuit 6 as described later.

(Switch Circuit)

The switch circuit 6 has the first semiconductor switches 61A, 61B, and 61C according to the phases of three-phase AC power and the second semiconductor switches 62A, 62B, and 62C according to the phases of three-phase AC power.

The first semiconductor switches 61A, 61B, and 61C have first ends and second ends. The first ends of the first semiconductor switches 61A, 61B, and 61C are connected to the second ends of the first windings 21A, 21B, and 21C via the second terminals 24A, 24B, and 24C, respectively. The second ends of the first semiconductor switches 61A, 61B, and 61C are connected to the first ends of the second windings 22A, 22B, and 22C via the third terminals 25A, 25B, and 25C, respectively. Specifically, the first semiconductor switch 61A is interposed between the first winding 21A and the second winding 22A. The first semiconductor switch 61B is interposed between the first winding 21B and the second winding 22B. The first semiconductor switch 61C is interposed between the first winding 21C and the second winding 22C.

The first semiconductor switches 61A, 61B, and 61C are switched between the on state and the off state according to a command signal from the controller 5. When being in the on state, the first semiconductor switches 61A, 61B, and 61C enable current to pass from the first windings 21A, 21B, and 21C to the second windings 22A, 22B, and 22C. When being in the off state, the first semiconductor switches 61A, 61B, and 61C disable current to pass from the first windings 21A, 21B, and 21C to the second windings 22A, 22B, and 22C.

The first semiconductor switches 61A, 61B, and 61C have transistors 63 and diodes 64. The transistors 63 are IGBTs (Insulated Gate Bipoler Transistors), for example. Collectors 63c of the transistors 63 constitute first ends of the first semiconductor switches 61A, 61B, and 61C. Emitters 63e of the transistors 63 constitute second ends of the first semiconductor switches 61A, 61B, and 61C. A command signal from the controller 5 is input to gates 63g of the transistors 63. Accordingly, the first semiconductor switches 61A, 61B, and 61C can be switched between the on state and the off state according to the command signal from the controller 5 (hereinafter, referred to as on/off switching).

The diodes 64 are connected in parallel to the transistors 63 to pass current from the emitters 63e to the collectors 63c. Accordingly, even in the off state, the current from the second windings 22A, 22B, and 22C to the first windings 21A, 21B, and 21C passes through the first semiconductor switches 61A, 61B, and 61C. As described above, the first semiconductor switches 61A, 61B, and 61C are configured to pass current bidirectionally in the on state, and pass current unidirectionally in the off state.

The second semiconductor switches 62A, 62B, and 62C have also first ends and second ends. The first ends of the second semiconductor switches 62A, 62B, and 62C are connected to a bypass circuit 67 not including the second windings 22A, 22B, and 22C. The bypass circuit 67 connects the first ends of the second semiconductor switches 62A, 62B, and 62C by a connection portion. The connection portion constitutes a neutral point NP2. The second ends of the second semiconductor switches 62A, 62B, and 62C are connected to the second ends of the first windings 21A, 21B, and 21C (the second terminals 24A, 24B, and 24C) and the first ends of the first semiconductor switches 61A, 61B, and 61C (collectors 63c), respectively. Specifically, the second end of the second semiconductor 62A is connected between the first winding 21A and the first semiconductor switch 61A. The second end of the second semiconductor switch 62B is connected between the first winding 21B and the first semiconductor switch 61B. The second end of the second semiconductor switch 62C is connected between the first winding 21C and the first semiconductor switch 61C.

The second semiconductor switches 62A, 62B, and 62C are switched between the on state and the off state according to a command signal from the controller 5. When being in the on state, the second semiconductor switches 62A, 62B, and 62C enable current to pass from the bypass circuit 67 to the first windings 21A, 21B, and 21C. When being in the off state, the second semiconductor switches 62A, 62B, and 62C disable current to pass from the bypass circuit 67 to the first windings 21A, 21B, and 21C.

The second semiconductor switches 62A, 62B, and 62C have transistors 65 and diodes 66. The transistors 65 are IGBTs as in the case of the transistors 63, for example. The collectors 65c of the transistors 65 constitute the first ends of the second semiconductor switches 62A, 62B, and 62C. Emitters 65e of the transistors 65 constitute the second ends of the second semiconductor switches 62A, 62B, and 62C. A command signal from the controller 5 is input to gates 65g of the transistors 65. Accordingly, the second semiconductor switches 62A, 62B, and 62C can be switched between the on state and the off state (on/off switching) according to the command signal from the controller 5.

The diodes 66 are connected in parallel to the transistors 65 to pass current from the emitters 65e to the collectors 65c. Accordingly, even in the off state, the current from the first windings 21A, 21B, and 21C to the bypass circuit 67 passes through the second semiconductor switches 62A, 62B, and 62C. As described above, the second semiconductor switches 62A, 62B, and 62C are also configured to pass current bidirectionally in the on state, and pass current unidirectionally in the off state.

The switch circuit 6 performs on/off switching of the first semiconductor switches 61A, 61B, and 61C and on/off switching of the second semiconductor switches 62A, 62B, and 62C according to a command signal from the controller 5. Accordingly, the switch circuit 6 switches the supply state of three-phase AC power between the first state and the second state.

In the first state, the first semiconductor switches 61A, 61B, and 61C are in the on state, and the second semiconductor switches 62A, 62B, and 62C are in the off state. This enables current to pass from the first windings 21A, 21B, and 21C to the second windings 22A, 22B, and 22C, and disables current to pass from the bypass circuit 67 to the first windings 21A, 21B, and 21C. Accordingly, three-phase AC power from the inverter 3 is supplied to both the first windings 21A, 21B, and 21C and the second windings 22A, 22B, and 22C.

In the second state, the first semiconductor switches 61A, 61B, and 61C are in the off state, whereas the second semiconductor switches 62A, 62B, and 62C are in the on state. This disables current to pass from the first windings 21A, 21B, and 21C to the second windings 22A, 22B, and 22C, and enables current to pass from the first windings 21A, 21B, and 21C to the bypass circuit 67. Accordingly, three-phase AC power from the inverter 3 is supplied to the first windings 21A, 21B, and 21C but is not supplied to the second windings 22A, 22B, and 22C.

The first semiconductor switches 61A, 61B, and 61C and the second semiconductor switches 62A, 62B, and 62C may be integrated as a semiconductor module. As illustrated above, the semiconductor module including a plurality of integrated semiconductor switches find widespread applications mainly as an inverter. This allows the use of the widely used semiconductor module at low costs.

(Snubber Circuit)

The snubber circuit 7 has a snubber capacitor 71, first diodes 72A, 72B, and 72C, and a second diode 73.

One electrode of the snubber capacitor 71 is connected to the emitters 63e (second ends) of the first semiconductor switches 61A, 61B, and 61C. The other electrode of the snubber capacitor 71 is connected to the collectors 65c (first ends) of the second semiconductor switches 62A, 62B, and 62C.

The first diodes 72A, 72B, and 72C are interposed between the snubber capacitor 71 and the first semiconductor switches 61A, 61B, and 61C, respectively. The first diodes 72A, 72B, and 72C are provided according to the first semiconductor switches 61A, 61B, and 61C, respectively, to keep insulation between the phases of AC power between the first windings 21A, 21B, and 21C and the second windings 22A, 22B, and 22C.

The second diode 73 is interposed between the snubber capacitor 71 and the second semiconductor switches 62A, 62B, and 62C. The collectors 65c of the second semiconductor switches 62A, 62B, and 62C are connected to one another via the neutral point NP2. Accordingly, at the collectors 65c, there is no need to keep insulation between the phases of AC power. Accordingly, it is not necessary to provide a plurality of second diodes 73 interposed between the snubber capacitor 71 and the second semiconductor switches 62A, 62B, and 62C (providing the second diode 73 according to each of the second semiconductor switches 62A, 62B, and 62C).

The first diodes 72A, 72B, and 72C and the second diode 73 enable current to pass from the collectors 65c to the emitters 63e. Meanwhile, the diodes 64 of the first semiconductor switches 61A, 61B, and 61C, and the diodes 66 of the second semiconductor switches 62A, 62B, and 62C enable current to pass from the emitters 63e to the collectors 65c. Therefore, in the closed circuit including the first semiconductor switches 61A, 61B, and 61C, the second semiconductor switches 62A, 62B, and 62C, the second diode 73, the snubber capacitor 71, and the first diodes 72A, 72B, and 72C, the direction in which the diodes 64 and 66 pass current and the direction in which the first diodes 72A, 72B, and 72C and the second diode 73 pass current coincide with each other. Specifically, when the first semiconductor switches 61A, 61B, and 61C and the second semiconductor switches 62A, 62B, and 62C are in the off state, the direction in which the first semiconductor switches 61A, 61B, and 61C and the second semiconductor switches 62A, 62B, and 62C pass current and the direction in which the first diodes 72A, 72B, and 72C and the second diode 73 pass current coincide with each other.

As described above, the snubber circuit 7 is provided between the emitters 63e of the first semiconductor switches 61A, 61B, and 61C and the collectors 65c of the second semiconductor switches 62A, 62B, and 62C.

Figure 3:
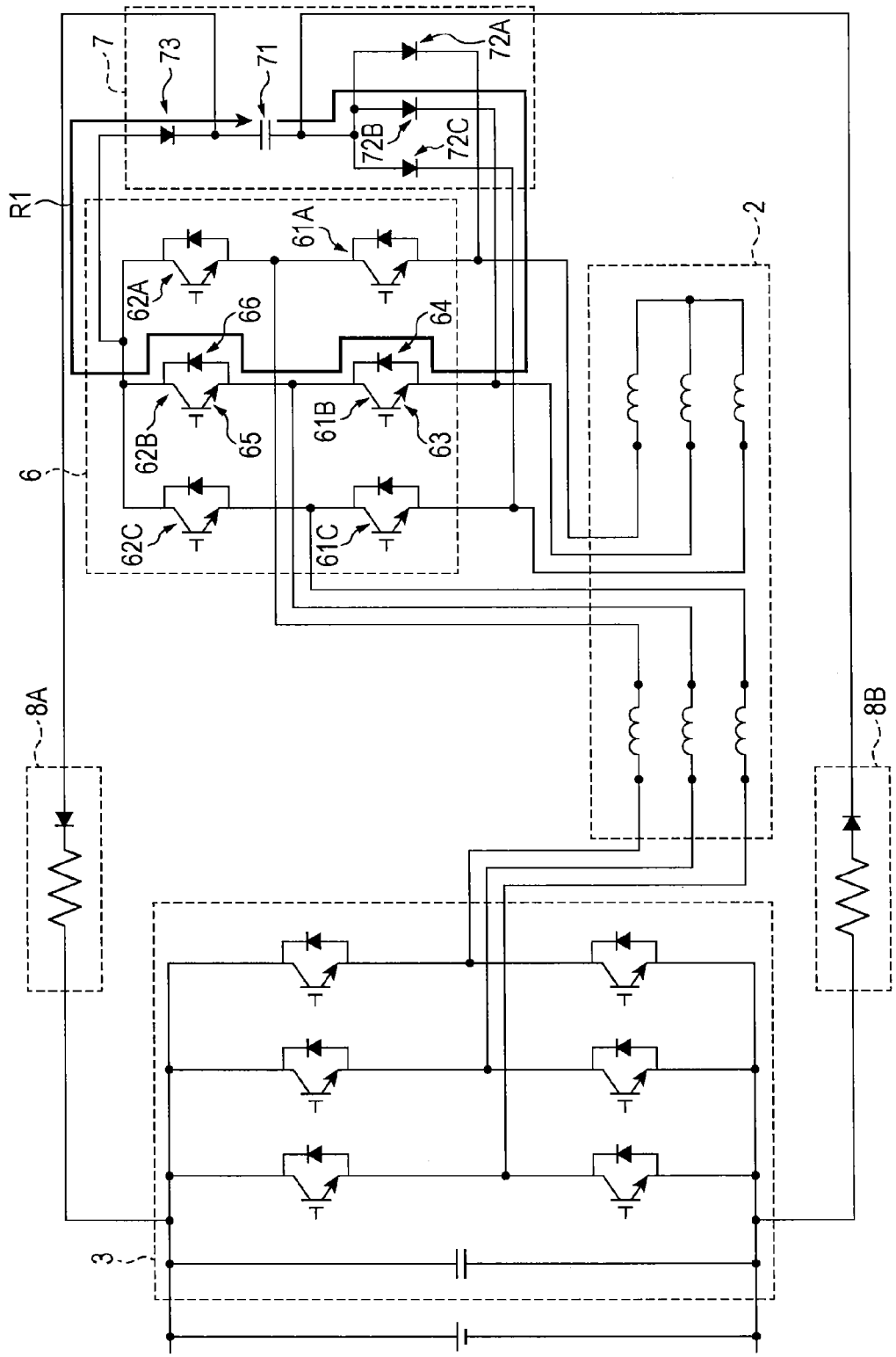
FIG. 3 is a diagram illustrating a route for absorption of a surge voltage.

When the first semiconductor switches 61A, 61B, and 61C or the second semiconductor switches 62A, 62B, and 62C are switched between the on and off states, a surge voltage is generated between both ends of the semiconductor switches. Together with this, a current is generated in a route R1 through any of the first diodes 72A, 72B, and 72C, the diode 64, the diode 66, and the second diode 73 (see FIG. 3). Accordingly, the surge voltage is absorbed in the snubber capacitor 71.

When the surge voltage is generated in either of the first semiconductor switch 61A and the second semiconductor switch 62A, the resultant current passes through the first diode 72A. When the surge voltage is generated in either of the first semiconductor switch 61B and the second semiconductor switch 62B, the resultant current passes through the first diode 72B. When the surge voltage is generated in either of the first semiconductor switch 61C and the second semiconductor switch 62C, the resultant current passes through the first diode 72C.

(Feedback Circuits)

The feedback circuit 8A connects the electrode of the snubber capacitor 71 at the second diode 73 side to the DC bus line 31A of the inverter 3. The feedback circuit 8B connects the electrode of the snubber capacitor 71 at the first diodes 72A, 72B, and 72C side to the DC bus line 31B of the inverter 3.

Each of the feedback circuits 8A and 8B has a diode 81 and a resistor 82. The diode 81 and the resistor 82 are connected in series. The diode 81 of the feedback circuit 8A is provided to enable current to pass from the snubber capacitor 71 to the DC bus line 31A. The diode 81 of the feedback circuit 8B is provided to enable current to pass from the DC bus line 31B to the snubber capacitor 71. Accordingly, the charge accumulated in the snubber capacitor 71 is discharged into the DC bus lines 31A and 31B.

Figure 4:
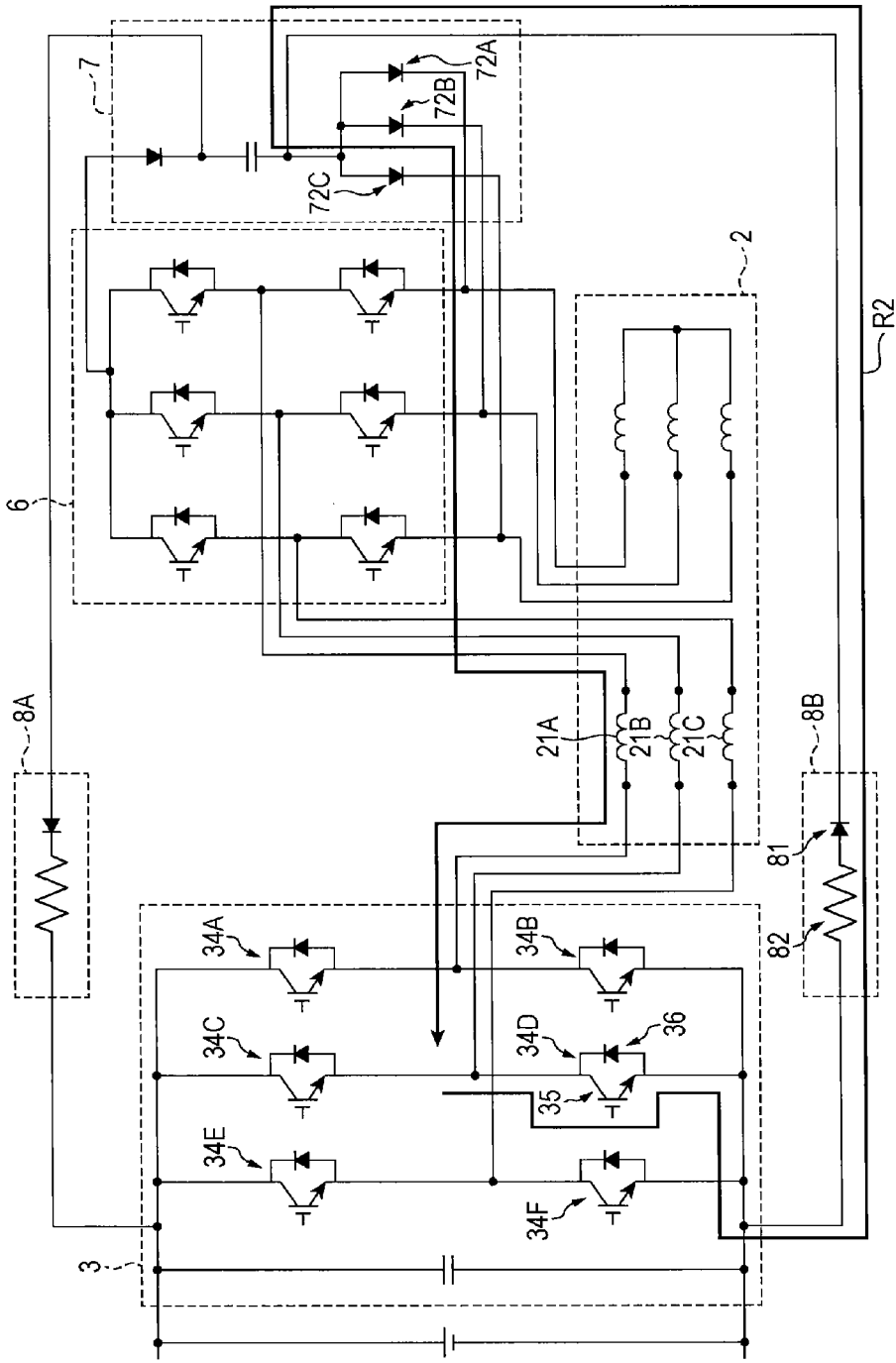
FIG. 4 is a diagram illustrating a route of flowing output current from an inverter to feedback circuits.

By providing the feedback circuits 8A and 8B, the current output from the inverter 3 (hereinafter, referred to as output current) also flows into the feedback circuits 8A and 8B. For example, when any of the semiconductor switches 34B, 34D, and 34F of the inverter 3 is in the on state, a route R2 is formed including the semiconductor switch(es) in the on state, the feedback circuit 8B, the first diodes 72A, 72B, and 72C, the diodes 64 of the first semiconductor switches 61A, 61B, and 61C, and the first windings 21A, 21B, and 21C (see FIG. 4). Accordingly, the output current flows into the feedback circuit 8B.

Figure 5:
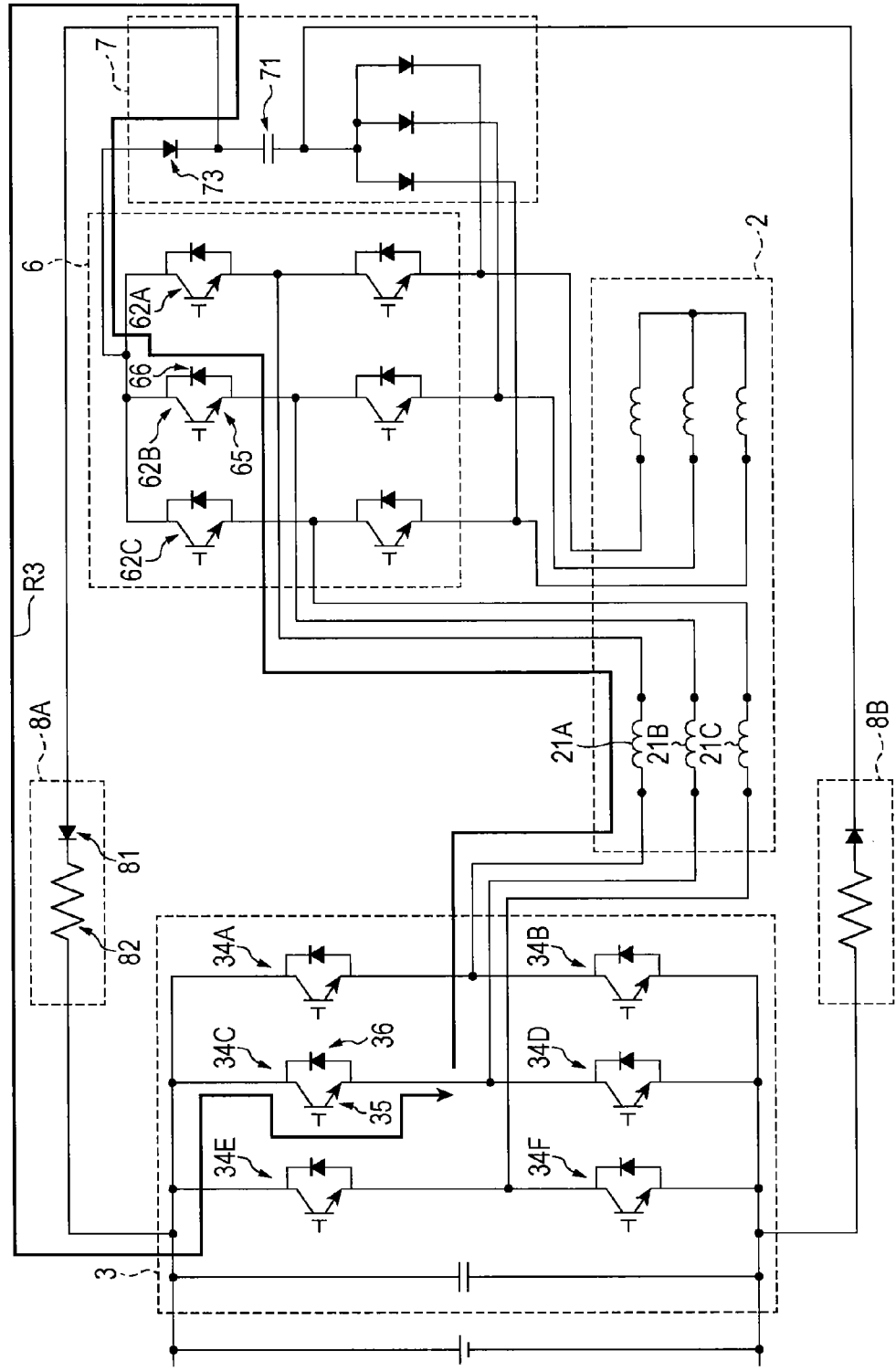
FIG. 5 is a diagram illustrating a route of flowing output current from the inverter to the feedback circuits.

When at least any of the semiconductor switches 34A, 34C, and 34E of the inverter 3 is in the on state, a route R3 is formed including the semiconductor switch(es) in the on state, the first windings 21A, 21B, and 21C, the diodes 66 of the second semiconductor switches 62A, 62B, and 62C, the second diode 73, and the feedback circuit 8A (see FIG. 5). Accordingly, the output current flows into the feedback circuit 8A.

Increase of the output current flowing into the feedback circuits 8A and 8B may make an influence on driving of the electric motor 2. In this respect, the feedback circuits 8A and 8B have the resistors 82. This suppresses flowing of the output current into the feedback circuits 8A and 8B. As a result, it is possible to suppress the influence of the output current flowing into the feedback circuits 8A and 8B on driving of the electric motor 2.

Advantageous Effects of the Embodiment

As described above, the drive unit 1 includes: the inverter 3; the electric motor 2 having the first winding 21A connected to the output part 37A of the inverter 3 and the second winding 22A connected to the first winding 21A; the first semiconductor switch 61A having the first end connected to the first winding 21A and the second end connected to the second winding 22A; the second semiconductor switch 62A having the first end and the second end connected to the first winding 21A and the first semiconductor switch 61A; and the snubber circuit 7 provided between the second end of the first semiconductor switch 61A and the first end of the second semiconductor switch 62A and having the snubber capacitor 71 and the diode (72A and/or 73).

According to the drive unit 1, the snubber capacitor 71 absorbs the surge voltage generated by the on/off switching of the first semiconductor switch 61A and the surge voltage generated by the on/off switching of the second semiconductor switch 62A. In addition, the diode (72A and/or 73) blocks the back-flow from the snubber capacitor 71. Accordingly, the one snubber circuit 7 suppresses the surge voltages generated by the on/off switching of the switches. Therefore, it is possible to suppress occurrence of surge voltages at the time of winding switching by the simple circuit configuration.

As the diode, the snubber circuit 7 may have the first diode 72A interposed between the first semiconductor switch 61A and the snubber capacitor 71 and the second diode 73 interposed between the snubber capacitor 71 and the second semiconductor switch 62A. In this case, it is possible to block the back-flow from the snubber capacitor 71 in a more reliable manner.

The first windings 21A, 21B, and 21C may be provided in correspondence with the three phases of three-phase AC power. The second windings 22A, 22B, and 22C may also be provided in correspondence with the three phases of three-phase AC power. The first semiconductor switches 61A, 61B, and 61C may also be provided in correspondence with the three phases of three-phase AC power. The second semiconductor switches 62A, 62B, and 62C may also be provided in correspondence with the three phases of three-phase AC power. That is, the first windings (21A, 21B, and 21C), the second windings 22A, 22B, and 22C, the first semiconductor switches (61A, 61B, and 61C), and the second semiconductor switches (62A, 62B, and 62C) may be provided for the plurality of phases of AC power.

The snubber circuit 7 may have the three first diodes 72A, 72B, and 72C that are interposed between the one snubber capacitor 71 and the three first semiconductor switches 61A, 61B, and 61C corresponding to the number of the phases of three-phase AC power, respectively. In this case, the three first diodes 72A, 72B, and 72C can suppress occurrence of a short-circuit between the phases of three-phase AC power between the first windings 21A, 21B, and 21C and the second windings 22A, 22B, and 22C. Further, the one snubber capacitor 71 can be shared among the first semiconductor switches 61A, 61B, and 61C and the second semiconductor switches 62A, 62B, and 62C corresponding to the phases of three-phase AC power. Therefore, it is possible to suppress occurrence of surge voltages at the time of winding switching by the simple circuit configuration.

The snubber circuit 7 may have the one second diode 73 interposed between the one snubber capacitor 71 and the second semiconductor switches 62A, 62B, and 62C corresponding to the number of the phases of three-phase AC power. In this case, the one second diode 73 can suppress the back-flow from the one snubber capacitor 71 to the three second semiconductor switches 62A, 62B, and 62C. Therefore, it is possible to suppress occurrence of surge voltages at the time of winding switching by the simple circuit configuration.

The first semiconductor switches 61A, 61B, and 61C and the second semiconductor switches 62A, 62B, and 62C may be configured to pass current bidirectionally in the on state and pass current unidirectionally in the off state. When the first semiconductor switches 61A, 61B, and 61C and the second semiconductor switches 62A, 62B, and 62C are in the off state, the direction in which the first semiconductor switches 61A, 61B, and 61C and the second semiconductor switches 62A, 62B, and 62C pass current and the direction in which the first diodes 72A, 72B, and 72C and the second diode 73 pass current may coincide with each other. In this case, the first semiconductor switches 61A, 61B, and 61C and the second semiconductor switches 62A, 62B, and 62C themselves can be used as part of the snubber circuit 7. Therefore, it is possible to suppress occurrence of surge voltages at the time of winding switching by the simple circuit configuration.

The drive unit 1 may further include the pair of feedback circuits 8A and 8B having the diodes 81. The feedback circuit 8A may be provided between the first end of the snubber capacitor 71 (electrode at the second diode 73 side) and the one DC bus line 31A of the inverter 3. The feedback circuit 8B may be provided between the second end of the snubber capacitor 71 (electrode at the first diodes 72A, 72B, and 72C side) and the other DC bus line 31B of the inverter 3. In this case, the charge accumulated in the snubber capacitor 71 is discharged into the DC bus lines 31A and 31B. This suppresses failure or damage of the snubber capacitor 71. As a result, it is possible to suppress occurrence of surge voltages in a more reliable manner.

The feedback circuits 8A and 8B may further have resistors 82 arranged in series with the diodes 81. In this case, it is possible to suppress flowing of output current into the feedback circuits 8A and 8B while allowing discharge from the snubber capacitor 71.

Figure 6:
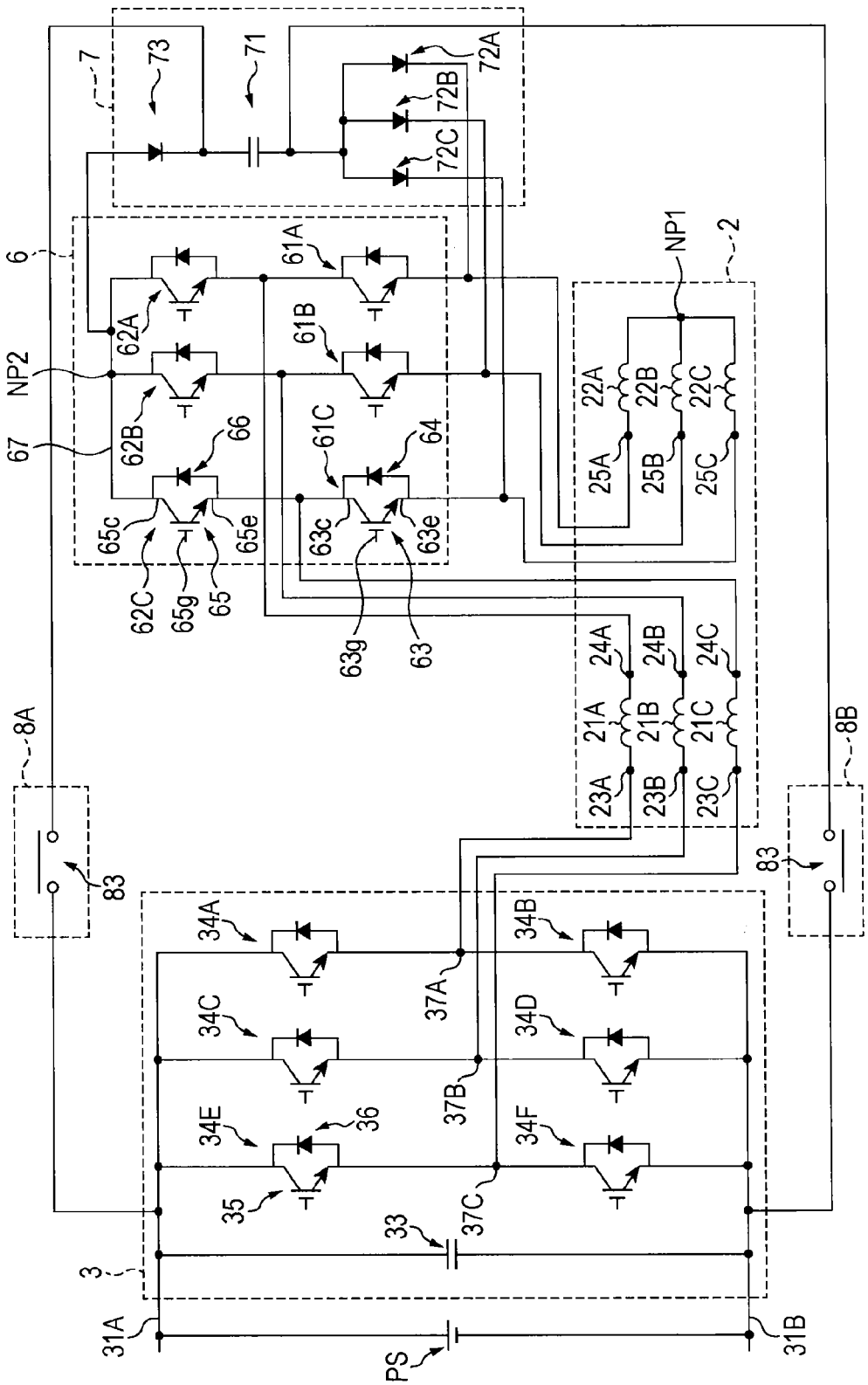
FIG. 6 is a circuit diagram illustrating a modification example of the drive unit.

The feedback circuits 8A and 8B may have switches 83 controllable by the controller 5 instead of the diodes 81 and the resistors 82 (see FIG. 6). In this case, by bringing the feedback circuits 8A and 8B into conduction at the time of discharge from the snubber capacitor 71 to the DC bus lines 31A and 31B, it is possible to suppress flowing of output current into the feedback circuits 8A and 8B in a more reliable manner.

In addition to the switches 83, the feedback circuits 8A and 8B may further have resistors 82 connected in series with the switches 83. In this case, it is possible to suppress flowing of output current into the feedback circuits 8A and 8B in a more reliable manner.

Figure 7:
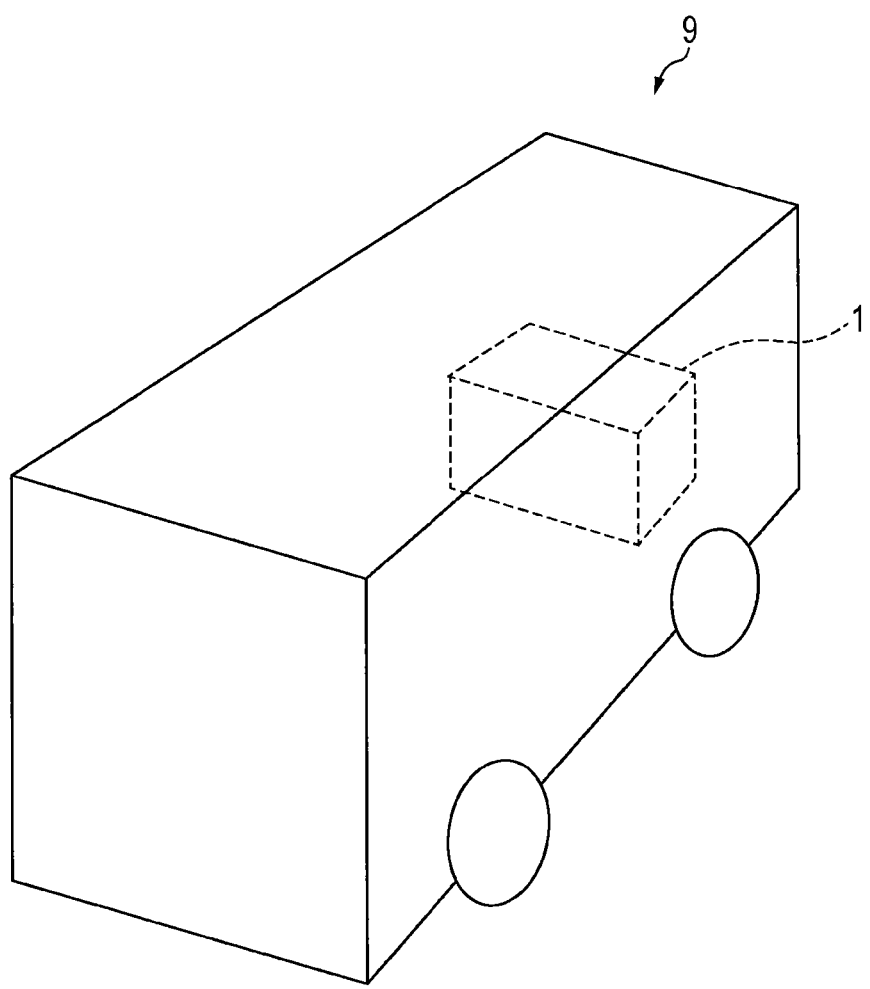
FIG. 7 is a schematic view of a transport machine.

The drive unit 1 is usable as a power source for various kinds of equipment and machinery. As an example of usage of the drive unit 1, FIG. 7 illustrates a transport machine 9 with the drive unit 1 as a power source. The transport machine 9 is an automobile or railway vehicle, for example.

The embodiments have been described so far. The techniques of the present disclosure are not necessarily limited to the foregoing embodiments. The techniques of the present disclosure can be modified in various manners without deviating from the gist of this disclosure. For example, the number of phases of AC power output from the inverter 3 is not limited to three. The number of phases may be any as far as it enables formation of a progressing magnetic field (rotating magnetic field, linearly progressing magnetic field, or the like). In addition, the transistors 63 and 65 are not limited to IGBTs but may be MOS-FETs (Metal Oxide Semiconductor Field Effect Transistors), for example. In this case, the transistors 63 and 65 pass current in one direction even in the off state. Accordingly, the diodes 64 and 66 may not be provided.

The power conversion devices according to the embodiments may be the following first to eighth drive units and the following first transport machine:

The first drive unit includes: an inverter; an electric motor that has a first winding connected to an output part of the inverter and a second winding connected to the first winding; a first semiconductor switch that has a first end connected to the first winding and a second end connected to the second winding; the second semiconductor switch that has a first end and a second end connected to the first winding and the first semiconductor switch; and a snubber circuit that is provided between the second end of the first semiconductor switch and the first end of the second semiconductor switch and has a capacitor and a diode.

In the second drive unit according to the first drive unit, the snubber circuit has a first diode that is interposed between the first semiconductor switch and the capacitor and a second diode that is interposed between the capacitor and the second semiconductor switch.

In the third drive unit according to the second drive unit, the first winding, the second winding, the first semiconductor switch, and the second semiconductor switch are provided in correspondence with a plurality of phases of AC power. The snubber circuit has a plurality of first diodes that are interposed between the one capacitor and a plurality of first semiconductor switches corresponding to the number of phases of the AC power.

In the fourth drive unit according to the third drive unit, the snubber circuit has the one second diode that is interposed between the one capacitor and a plurality of second semiconductor switches corresponding to the number of phases of the AC power.

In the fifth drive unit according to any of the second to fourth drive units, the first semiconductor switch and the second semiconductor switch pass current bidirectionally in an on state and pass current unidirectionally in an off state. The direction in which the first semiconductor switch passes current in the off state and the direction in which the first diode and the second diode pass current coincide with each other.

The sixth drive unit according to any of the first to fifth drive units further includes a pair of feedback circuits that is provided between both ends of the capacitor and a pair of DC bus lines of the inverter, and has a diode.

In the seventh drive unit according to the sixth drive unit, each of the feedback circuits further has a resistor arranged in series with the diode.

The eighth drive unit according to any of the first to fifth drive units further includes a pair of feedback circuits that is provided between both ends of the capacitor and a pair of DC bus lines of the inverter, and has a switch.

The first transport machine has any of the first to eighth drive units.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A drive unit comprising:
an inverter;
an electric motor that has a first winding connected to an output part of the inverter and a second winding connected to the first winding;
a first semiconductor switch that has a first end connected to the first winding and a second end connected to the second winding;
a second semiconductor switch that has a first end and a second end connected to the first winding and the first semiconductor switch; and
a snubber circuit that is provided between the second end of the first semiconductor switch and the first end of the second semiconductor switch and has a capacitor and a diode.

2. The drive unit according to claim 1, wherein
the snubber circuit has, as the diode, a first diode that is interposed between the first semiconductor switch and the capacitor and a second diode that is interposed between the capacitor and the second semiconductor switch.

3. The drive unit according to claim 2, wherein
the first winding, the second winding, the first semiconductor switch, and the second semiconductor switch are provided for a plurality of phases of AC power, and
the snubber circuit has a plurality of the first diodes that is interposed between the one capacitor and a plurality of the first semiconductor switches corresponding to the number of phases of the AC power.

4. The drive unit according to claim 3, wherein
the snubber circuit has the one second diode that is interposed between the one capacitor and a plurality of the second semiconductor switches corresponding to the number of phases of the AC power.

5. The drive unit according to claim 2, wherein
the first semiconductor switch and the second semiconductor switch are configured to pass current bidirectionally in an on state and pass current unidirectionally in an off state, and
the direction in which the first semiconductor switch and the second semiconductor switch pass current in the off state and the direction in which the first diode and the second diode pass current coincide with each other.

6. The drive unit according to claim 1, further comprising
a pair of feedback circuits, each of the pair of feedback circuits being provided between a first end of the capacitor and one DC bus line of the inverter and between a second end of the capacitor and the other DC bus line of the inverter, and having a diode.

7. The drive unit according to claim 6, wherein
each of the feedback circuits further has a resistor arranged in series with the diode.

8. The drive unit according to claim 1, further comprising
a pair of feedback circuits, each of the pair of feedback circuits being provided between a first end of the capacitor and one DC bus line of the inverter and between a second end of the capacitor and the other DC bus line of the inverter, and having a switch.

9. The drive unit according to claim 8, wherein
each of the feedback circuits further has a resistor connected in series with the switch.

10. A transport machine comprising a drive unit, wherein
the drive unit includes:
an inverter;
an electric motor that has a first winding connected to an output part of the inverter and a second winding connected to the first winding;
a first semiconductor switch that has a first end connected to the first winding and a second end connected to the second winding;
a second semiconductor switch that has a first end and a second end connected to the first winding and the first semiconductor switch; and
a snubber circuit that is provided between the second end of the first semiconductor switch and the first end of the second semiconductor switch and has a capacitor and a diode.

* * * * *